United States Patent
Wass et al.

[11] Patent Number: 5,741,022
[45] Date of Patent: Apr. 21, 1998

[54] BALL-EXCHANGE TRAILER HITCH

[76] Inventors: Lloyd G. Wass, 1670 Blackhawk Cove, Eagan, Minn. 55122; Michael Nelson, Rte. 2, Box 100, Henry, S. Dak. 57243; Kurt L. Drewelow, 214 E. Mound St., Shakopee, Minn. 55379

[21] Appl. No.: 654,011

[22] Filed: May 28, 1996

Related U.S. Application Data

[63] Continuation of Ser. No. 346,859, Nov. 30, 1994, abandoned.

[51] Int. Cl.$^6$ .................................................. B60D 1/06
[52] U.S. Cl. .................... 280/507; 280/511; 403/131; 411/348
[58] Field of Search .................... 280/511, 507, 280/504, 416.1; 403/131, 328; 411/348, 910, 237; 285/271

[56] References Cited

U.S. PATENT DOCUMENTS

| | | | |
|---|---|---|---|
| 2,696,392 | 12/1954 | Case | 280/513 |
| 2,884,261 | 4/1959 | Farr | 280/512 |
| 3,414,295 | 12/1968 | Rendessy | 280/511 |
| 3,442,534 | 5/1969 | McCorkle | 280/511 |
| 3,630,546 | 12/1971 | Church | 280/511 |
| 3,782,762 | 1/1974 | Nagy et al. | 280/507 |
| 3,963,264 | 6/1976 | Down | 280/415 A |
| 4,201,400 | 5/1980 | Hoogenbosch | 280/511 |
| 4,230,336 | 10/1980 | Avrea et al. | 280/507 |
| 4,232,877 | 11/1980 | Milton | 280/415 A |
| 4,319,766 | 3/1982 | Corteg et al. | 280/511 |
| 4,433,854 | 2/1984 | Smith | 280/511 |
| 4,522,421 | 6/1985 | Vance | 280/511 |
| 4,596,406 | 6/1986 | Van Vleet et al. | 280/511 |
| 4,889,356 | 12/1989 | Morris | 280/416.1 |
| 4,938,496 | 7/1990 | Thomas et al. | 280/511 |
| 5,040,817 | 8/1991 | Dunn | 280/511 |
| 5,085,452 | 2/1992 | Janeiro | 280/511 |
| 5,116,072 | 5/1992 | Swenson | 280/511 |
| 5,135,247 | 8/1992 | Alfaro et al. | 280/415.1 |
| 5,169,168 | 12/1992 | Harry et al. | 280/511 |
| 5,280,941 | 1/1994 | Guhlin | 280/507 |
| 5,290,057 | 3/1994 | Pellerito | 280/511 X |
| 5,395,131 | 3/1995 | Herrick | 280/511 X |
| 5,419,576 | 5/1995 | Van Vleet | 280/511 X |
| 5,511,814 | 4/1996 | Floyd | 280/511 |

FOREIGN PATENT DOCUMENTS

| | | | |
|---|---|---|---|
| 1659235 | 6/1991 | U.S.S.R. | 280/511 |

Primary Examiner—Anne Marie Boehler

[57] ABSTRACT

A ball-exchange trailer hitch system having a post for receiving a ball where the ball is removable from the post for exchangeability with different size balls. The system includes at least a double locking feature between the ball and post. The double lock consists of a side pin lock and a ball and cage lock. The system may also include a third lock which includes threads on the post and the ball.

27 Claims, 7 Drawing Sheets

BALL-EXCHANGE TRAILER HITCH

This is a continuation of application Ser. No. 08/346,859, filed Nov. 30, 1994, now abandoned.

BACKGROUND OF THE INVENTION

The present invention relates to a trailer hitch system in which trailer balls can be exchanged easily and quickly.

Since the advent of the "horseless carriage" early in this century, vehicle owners have found it useful to pull various types of trailers behind them. Early trailers were usually connected to tow vehicle draw bars with a bolt or pin. This arrangement was noisy (due to the necessary looseness of the connection which allows for ease of turning) and often unsafe. As technology pertaining to both vehicles and roads improved in the 1930's and 1940's thus causing road speeds to increase, the need for more efficient and reliable trailer couplers became evident. As a result, the use of ball type couplers became increasingly popular and, after World War II, nearly all new light and medium duty trailers were factory outfitted with ball couplers (also referred to as ball sockets).

The trailer has proven to be a convenient and very versatile piece of equipment that can be easily adapted for a wide variety of uses with an accompanying wide range of load carrying capabilities. As a result, the need for and use of various size (and strength) ball couplers has become common. This situation has generally resulted in the use of 1⅞" ball couplers for lightweight trailers, 2" ball couplers for medium weight trailers and 2¹⁵⁄₁₆" ball couplers on heavy weight trailers.

As the availability and widespread use of specialty consumer products such as boats, riding lawn mowers, snowmobiles and all-terrain vehicles has proliferated in recent years, so has the need for, and use of, specialty trailers to transport them. Also, technological improvements in 4-wheel-drive vehicles has made it possible to routinely pull a wide variety of trailers in both on and off-road situations. This trend has been accelerated since the mid 1980's by the availability and increasing popularity of the highly versatile "sport utility" vehicles-vehicles that afford comfort and power for highway towing while still having ample road clearance and ruggedness for off-road trailer moving.

As a result, a situation has developed where vehicle owners routinely require or encounter the need to pull a wide variety of trailers. These trailers commonly have different size ball couplers. At first glance, this would not seem to present much of a problem, since different size trailer balls can be simply bolted or unbolted to vehicle bumpers and/or hitch draw bars with commonly available wrenches. However, in the real world of rust and rocks, routine installation and removal typically becomes a time-consuming exercise of frustration. Because of safety considerations, trailer balls must be semi-permanently installed to high nut torque values, which requires heavy duty wrenches. This, in turn, results in the need for extra strong wrenches (preferably with "cheater bar" or extension bar capability) for removal. It is not uncommon in severe cases, where trailer balls have been left installed for some time (and have encountered a variety of environmental hazards), to require the aid of a cutting torch to remove the ball. Of course, this renders the ball useless for reinstallation.

Given this background, a widespread need has developed for a "quick change" ball system that permits a tow vehicle to be quickly and easily converted to different ball sizes. The ball system that meets this "quick-change" need must also meet customer demands for safety, user-friendliness and durability.

SUMMARY OF THE INVENTION

The ball-exchange trailer hitch system is a unique configuration including an interlocking ball and a post that allow various size trailer balls to be easily and quickly installed. The interlocking ball is either double or triple locked onto a pre-installed and permanently mounted post. The double lock system utilizes a side pin lock and ball and cage lock. The triple locking system utilizes both the side pin lock and the ball and cage lock of the double lock system above plus a screw thread connection which creates a third locking feature. Both systems provide levels of security, reliability and user-friendliness unattainable from other ball hitch systems.

DETAILED DESCRIPTION OF THE PREFERRED EMBODIMENTS

Figure 1:
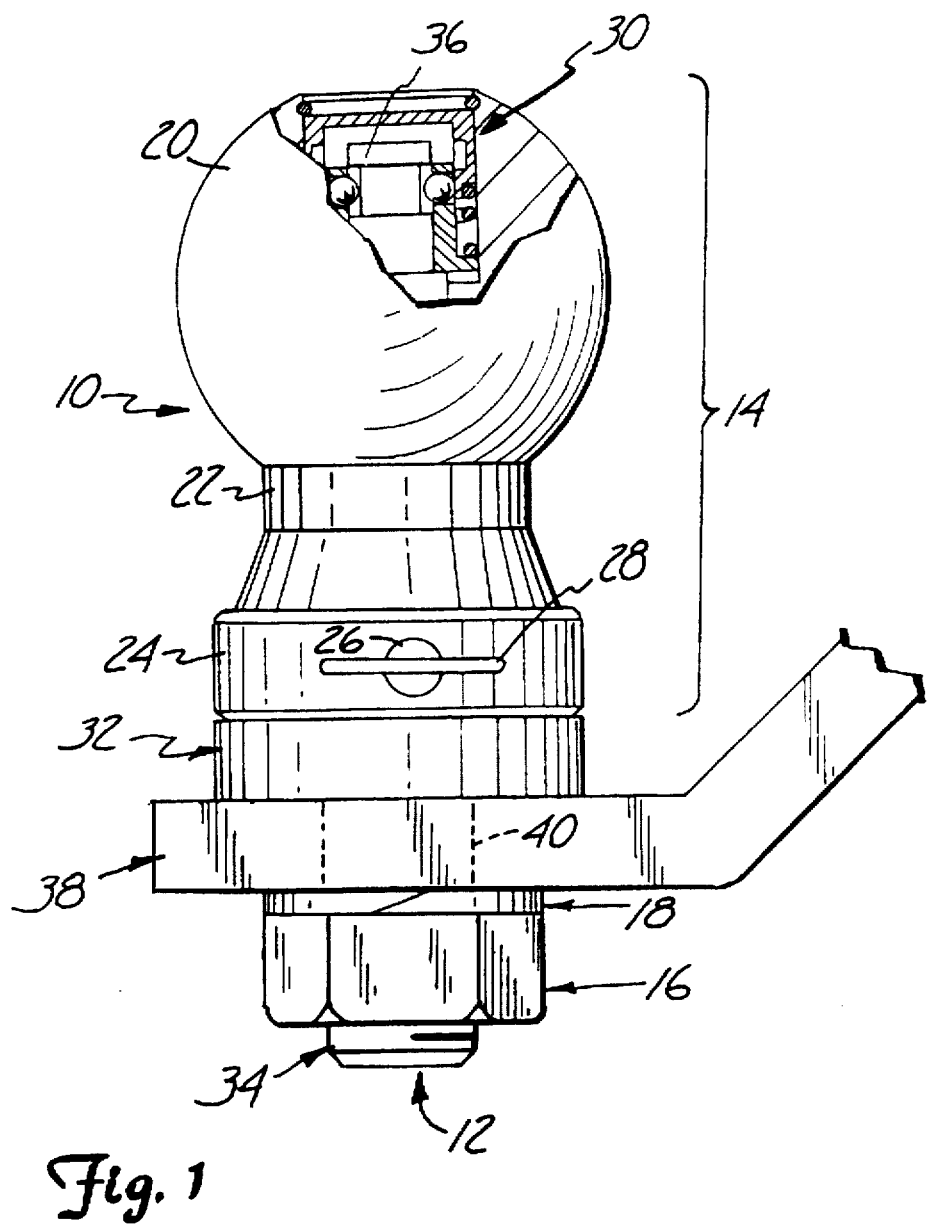
FIG. 1 is a side view with portions broken away of the ball exchange trailer hitch system.

An exchangeable trailer ball hitch system 10 is shown in FIG. 1. This system makes exchanging various size ball hitches quick and easy. Exchangeable trailer ball hitch system 10 comprises a post 12, a ball 14, and a nut 16. Exchangeable trailer ball hitch system 10 may also include a lock washer 18.

Ball 14 includes a spherical portion 20, a neck portion 22, and a base portion 24. Ball 14 further includes two locking systems or mechanisms for interlocking post 12 and ball 14. The first locking mechanism is a side pin lock 26 with a spiral ring 28 attached thereto. The second locking mechanism is a ball and cage lock 30.

Post 12 includes a flange 32, a threaded lower shaft 34, and a ball receiving upper shaft 36. Post 12 is mounted on plate 38, which may be a draw bar, bumper, or other ball hitch support on a vehicle, and which has an aperture 40 therein. Threaded shaft 34 on post 12 is inserted into aperture 40 such that flange 32 rests on plate 38. Nut 16 is threaded onto threaded shaft 34 of post 12 so that post 12 is securely fastened to plate 38. Flange 32 and lock washer 18 of nut 16 sandwich plate 38 therebetween. Ball 14 is selectively attachable to and detachable from post 12 when side pin lock 26 and ball and cage lock 30 are engaged or disengaged, respectively. This allows the user of exchangeable trailer ball hitch system 10 to exchange various balls of different sizes as needed without having to remove nut 16.

The steps to exchange a ball with another ball are as follows. Ball 14 must be disengaged from post 12. Side pin lock 26 and ball and cage lock 30 must both be disengaged for this to occur. The disengagement of side pin lock 26 and ball and cage lock 30 may occur simultaneously or sequentially. For ease of use, the sequential method is preferred since side pin lock 26 may be disengaged and the ball may be turned thereby prohibiting re-engagement. Ball and cage lock 30 may then be disengaged and ball 14 removed from post 12. There may also be sufficient play in ball and cage lock 30 such that side pin lock 26 may be disengaged and ball 14 may be slightly lifted so that re-engagement does not occur. In either case, or through simultaneous disengagement of the locking mechanisms, ball 14 is detached from post 12 and may be removed. Another ball, which may be of similar or dissimilar shape and size, then may be attached to post 12. This exchangeability allows the vehicle user to easily tow trailers having varying sizes of sockets on each trailer tongue because the user can quickly and easily change ball sizes and shapes.

The attachment of ball 14 to post 12 merely requires placing ball 14 on ball receiving shaft 36 of post 12 and lowering ball 14 over ball receiving shaft 36 until base portion 24 is adjacent to flange 32. Ball and cage lock 30 will automatically interlock with ball receiving shaft 36 while side pin lock 26 engages ball receiving shaft 36 if properly aligned. If proper alignment does not occur, the user merely needs to rotate ball 14 until side pin lock 26 springs into engagement.

Figure 2:
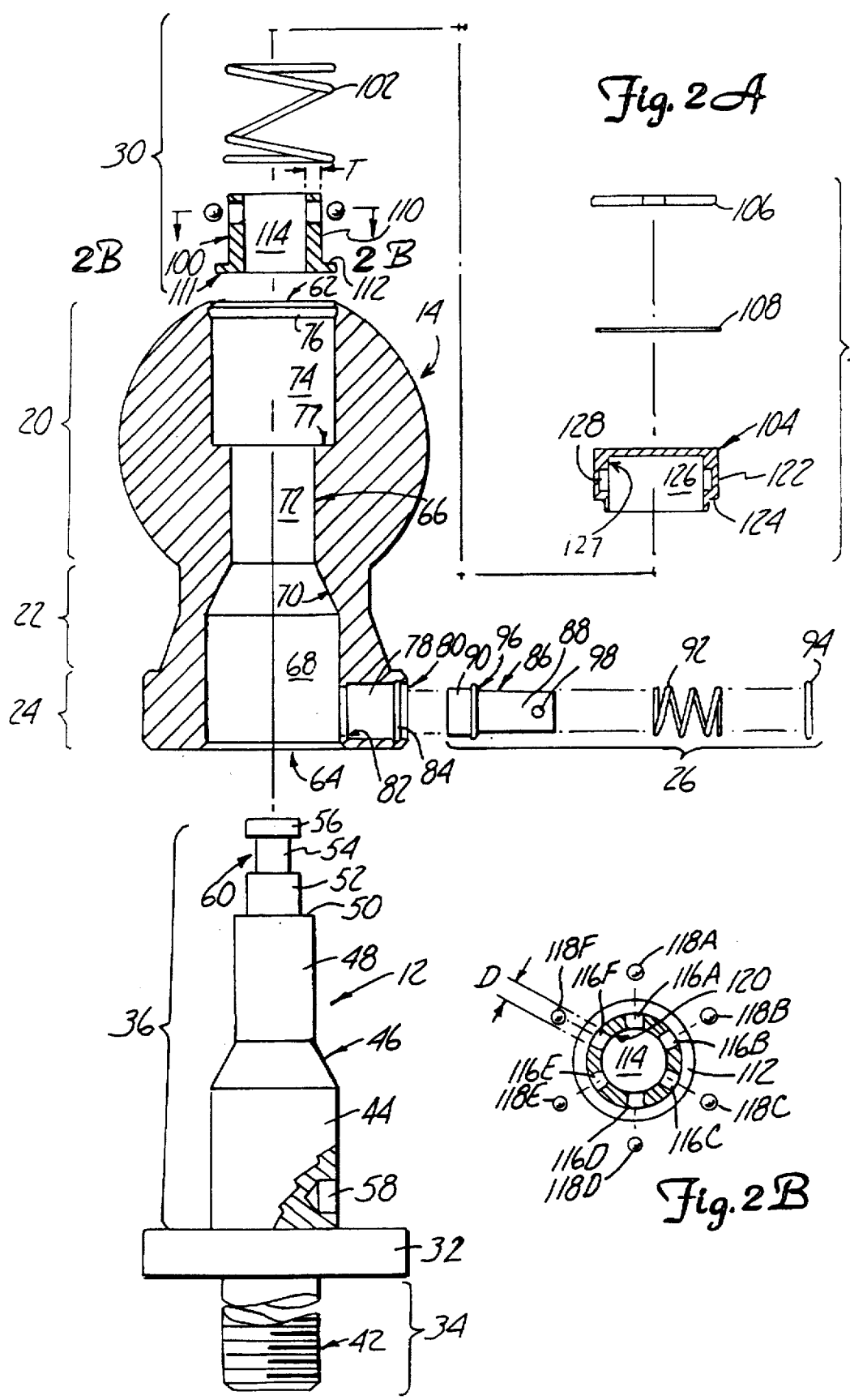
FIG. 2A is an exploded, side sectional view of the ball exchange trailer hitch system of FIG. 1.
FIG. 2B is a top sectional view of the quick connect cage and ball bearings as shown at section 2B—2B of FIG. 2A.

Post 12, ball 14, side pin lock 26, and ball and cage lock 30 are shown in more detail in the exploded partially sectioned view in FIG. 2A. FIG. 2A shows ball 14 disengaged and removed from post 12. Side pin lock 26 and ball and cage lock 30 are shown exploded away from ball 14. Post 12 comprises threaded lower shaft 34 having a plurality of threads 42, flange 32, and ball receiving upper shaft 36 which includes a pin lock receiving section 44, a ball stop shoulder 46, a ball and cage lock support section 48, a lock support shoulder 50, a ball and cage receiving section 52, a ball bearing interaction section 54, and a locking flange 56. Side pin lock receiving section 44 includes a side pin lock seat 58. The smaller diameter of ball bearing interaction section 54 in comparison to adjacent parts ball and cage receiving section 52 and flange 56 results in a ball locking channel 60.

Ball 14 has spherical portion 20 with a lock opening 62, neck portion 22, and base portion 24 with a post opening 64. A bore 66 extends from lock opening 62 to post opening 64. Bore 66 comprises a lower bore section 68, a post stop shoulder 70, an intermediate bore section 72, and a upper bore section 74 with a snap ring receiving ridge or groove 76 therein. Upper bore section 74 has a cage support shoulder 77 therein. A side pin lock bore 78 extends from lower bore section 68 to a side pin lock opening 80. Side pin lock bore 78 includes a pin stop shoulder 82 and a snap ring ridge or groove 84. Side pin lock 26 comprises a lock pin 86 with a spring receiving portion 88 and a post engaging portion 90, a spring 92, and a snap ring 94. Lock pin 86 includes a spring shoulder 96 in between spring receiving portion 88 and post engaging portion 90, and a ring connecting aperture 98 for receiving spiral ring 28.

Ball and cage lock 30 includes a quick connect cage 100, a spring 102, a quick connect housing 104, and a snap ring 106. Ball and cage lock 30 may also include a label 108 containing instructions or other operational directions. Quick connect cage 100 is a cylindrical body 110 having a base 111 that defines a cage flange 112. Cylindrical body 110, as shown in more detail in FIG. 2B, has an internal bore 114 and six (6) bearing bores 116A, 116B, 116C, 116D, 116E, and 116F which are radial to bore 114. Each of the bearing bores contains a bearing 118A, 118B, 118C, 118D, 118E, and 118F.

Each of the bearing bores 116A-116F has a diameter D. The innermost circumference of each bearing bore 116A-116F, where the innermost circumference is along an inner surface 120 of cylindrical body 110, is of slightly smaller diameter than the rest of the bearing bore. This slightly smaller diameter creates a circumferential ridge in each bore so that bearings 118A-118F cannot completely pass through bearing bores 116A-116F, respectively, and into bore 114.

Quick connect housing 104 is a cylindrical body 122 having a housing shoulder 124. Cylindrical body 122 has an internal cavity 126 for receiving cylindrical body 110. Internal cavity 126 has a generally cylindrical shape with a race or circumferential groove 128 around the entire perimeter of an inner surface 127 in the internal cavity 126.

Spring 102 slides over cylindrical body 110 and rests on cage flange 112. The other end of spring 102 rests on housing shoulder 124. Ball and cage lock 30 is inserted into upper bore section 74 in ball 14 and spring 102 is compressed until snap ring 106 is positioned in snap ring groove 76. Base 111 of quick connect cage 100 rests against cage support shoulder 77 while the top of quick connect housing 104 rests against snap ring 106. These two outer restrictions place spring 102 in compression which results in quick connect cage 100 being biased away from quick connect housing 104.

In a similar manner, spring 92 slides over spring receiving portion 88 and lock pin 86 is inserted into side pin lock bore 78 such that spring shoulder 96 rests against pin stop shoulder 82. Spring 92 is then compressed until snap ring 94 is positioned into snap ring groove 84. Pin stop shoulder 82 prohibits further insertion of lock pin 86 into bore 66 when ball receiving shaft 36 is not in bore 66.

Figure 3:
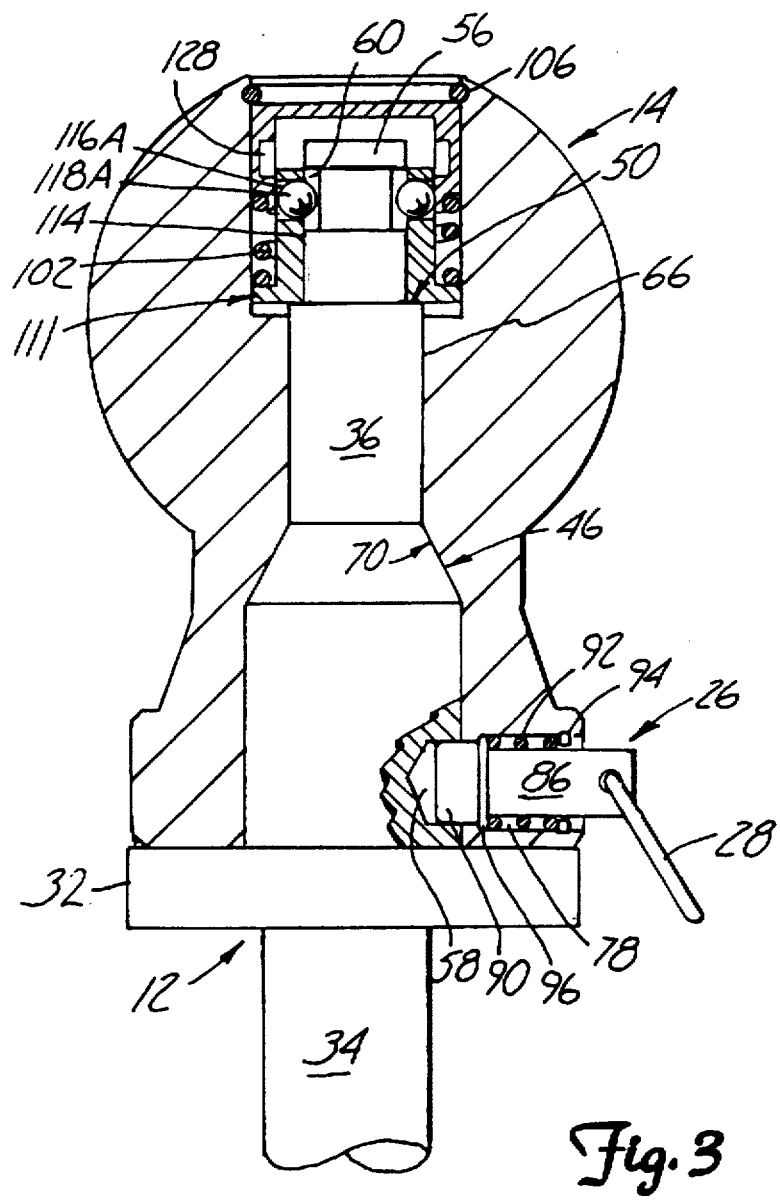
FIG. 3 is a side sectional view of the ball exchange trailer hitch system of FIG. 1 when in a double locked position.

FIG. 3 discloses ball 14 fully inserted onto ball receiving shaft 36 of post 12 such that both locking mechanisms, i.e., side pin lock 26 and ball and cage lock 30, are engaged.

Ball 14 is prohibited from sliding off of post 12. Spring 92, which is in compression, is fixed against snap ring 94 such that the compression of the spring forces post engaging portion 90 away from snap ring 94. Post engaging portion 90 of side pin lock 26 extends inward into bore 66 from base portion 26 of ball 14 and seats in side pin lock seat 58 of post 12. The insertion of post engaging portion 90 into side pin locks seat 58 secures ball 14 onto post 12. The compression of spring 94 is sufficient to bias spring shoulder 96 away from snap ring 94.

Similarly, ball bearings 118A-118F extend inward into ball locking channel 60 such that locking flange 56 is restricted from passing between ball bearings 118A-118F. The diameter D of each of ball bearings 118A-118F is larger than the thickness of cylindrical body 110 resulting in a portion of each ball bearing always extending into bore 114 or hanging out in race 128. The compression position of spring 102 causes quick connect cage 100 and quick connect housing 104 to oppose one another. Race 128 and bearing apertures 116A-116F are not aligned due to this opposition. Ball bearings 118A-118F are forced inward into ball locking channel 60 by inner surface 127 since race 128 is not aligned with ball bearing bores 116A-116F. This prohibits ball bearings 118A-118F from moving within ball bearing apertures 116A-116F into an outward position where the bearings do not extend into ball locking channel 60.

Figure 4:
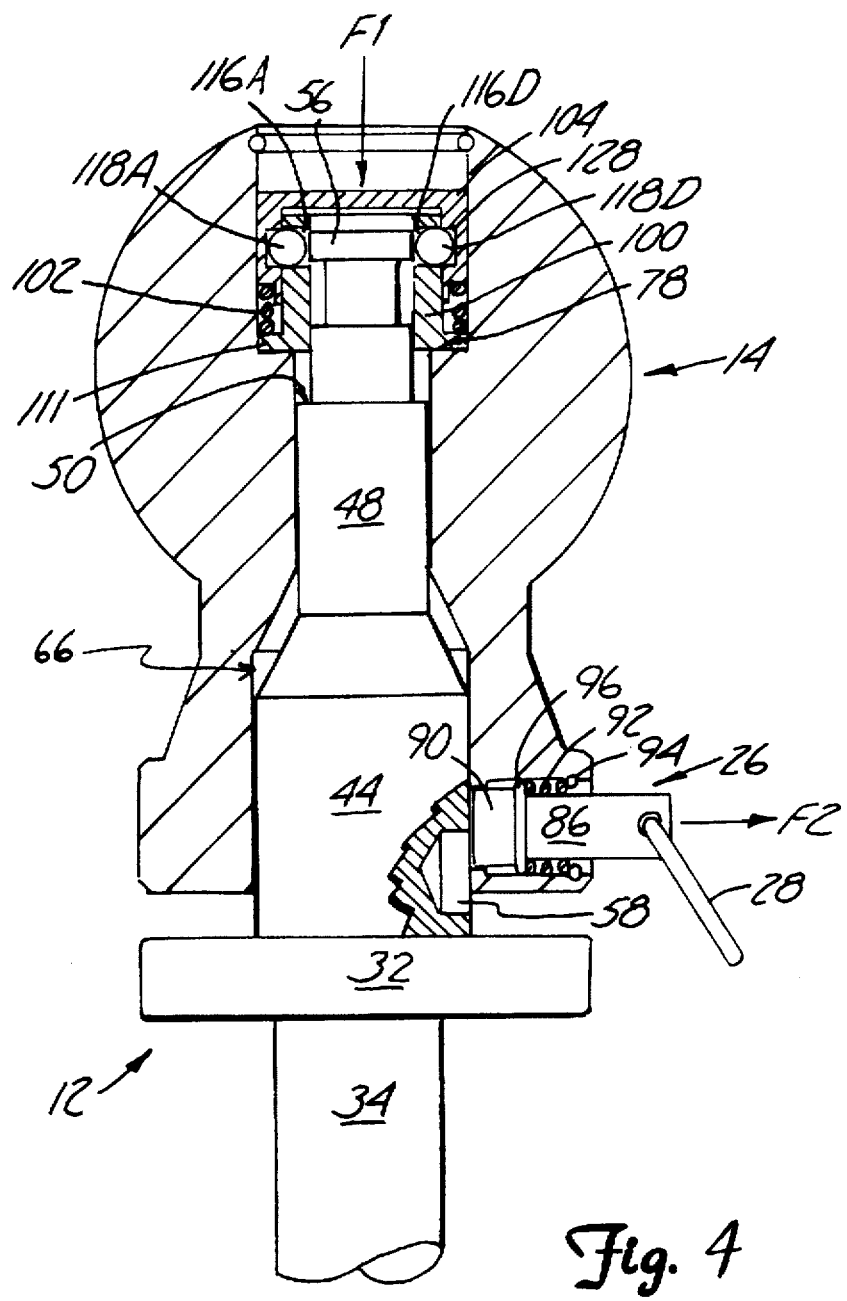
FIG. 4 is a side view of the ball exchange trailer hitch system of FIG. 1 when disengaged.

FIG. 4 shows side pin lock 26 disengaged from post 12. A force F2 is placed upon side pin lock 26 such that post engaging portion 90 is withdrawn from side pin lock seat 58. Force F2 is typically placed upon spiral ring 28. The compression spring 92 is increased as spring shoulder 96 compresses spring 92 against snap ring 94. After post engaging portion 90 is fully removed from side pin lock seat 58, ball 14 is rotatable around post 12 such that side pin lock 26 is no longer aligned with side pin lock seat 58.

FIG. 4 shows side pin lock 26 disengaged from post 12 and ball and cage lock 30 in a disengaged position such that locking flange 56 is not deterred by ball bearings 118A–118F from sliding out of bore 66 as ball 14 is removed from post 12. A force F1 is placed on quick connect housing 104 to push the housing away from snap ring 106. This movement of quick connect housing 104 away from snap ring 106 compresses spring 102 further resulting in internal cavity 126 further receiving quick connect cage 100. The result of quick connect housing 104 receiving quick connect cage 100 is the alignment of race 128 with ball bearing bores 116A–116F. This alignment removes the restriction on ball bearings 118A–118F that inner surface 127 presents. Ball bearings 118A–118F are thus movable within ball bearing bores 116A–116F. Bearings 118A–118F may then move from the position where the bearings extend into bore 114, as shown in FIG. 3, to the position where the bearings hang out in race 128, as shown in FIG. 4. The pulling of ball 14 off of post 12 causes locking flange 56 to press against ball bearings 118A–118F thereby moving them out into race 128 such that locking flange 56 may exist out of internal bore 114.

Figure 5:
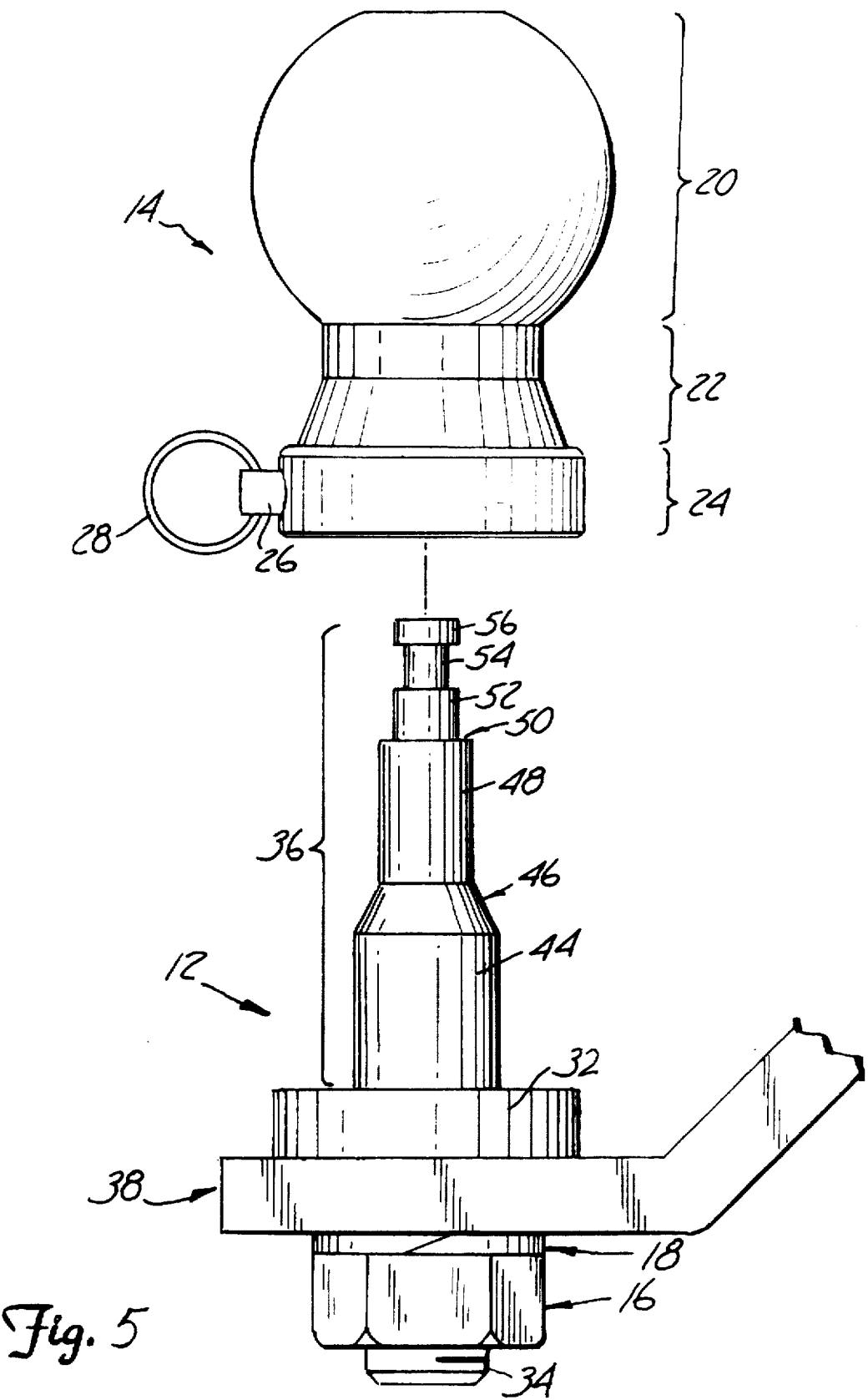
FIG. 5 is a side sectional view of the ball exchange trailer hitch system in FIG. 1 just after each of the locks has disengaged.

Ball 14 may then be completely removed from post 12 as is shown in FIG. 5. After ball receiving shaft 36 is removed from bore 66, post engaging portion 90 of side pin lock 26 is pushed into bore 66 based upon the compression of spring 92. Similarly, quick connect housing 104 is pushed away from quick connect cage 100 and back into contact with snap ring 106. Post 12 remains attached to plate 38 on the vehicle. Ball 14 need not be immediately replaced and may be stored in a trunk or other location away from post 12. Eventually, the user of the vehicle will want ball 14 or another ball of similar or dissimilar size and shape to be positioned onto post 12.

To connect or reconnect ball 14 onto post 12, align bore 66 in ball 14 with ball receiving shaft 36 of post 12. Ball 14 is then lowered onto ball receiving shaft 36 until base portion 24 rests upon flange 32. Ball bearings 118A–118F are extending into bore 114 at this time because quick connect cage 100 and quick connect housing 104 are biased away from each other by spring 102. Locking flange 56 engages ball bearings 118A–118F and cannot pass because the bearings are forced inward into ball locking channel 60 by inner surface 127. Continued downward force on ball 14 toward support flange 32 results in locking flange 56 pushing ball bearings 118A–118F upward thereby forcing quick connect cage 100 further into cylindrical housing 126 of quick connect housing 104. Race 128 aligns with ball bearing apertures 116A–116F and allows locking flange 56 to pass because ball bearings 118A–118F moved outward from ball locking channel 60 and into race 128. After locking flange 56 has passed through, spring 102 pushes quick connect cage 100 and quick connect housing 104 away from each other again.

Prior to the placement of ball 14 on post 12, post engaging portion 90 extends into bore 66. The insertion of ball receiving shaft 36 into bore 66 results in post engaging portion 90 being forced out of bore 66 by the various portions of ball receiving shaft 36 including sloped ball stop shoulder 46. When base portion 24 rests upon support flange 32, ball and cage lock 30 will have re-engaged. In contrast, side pin lock 26 may or may not have engaged depending upon the alignment of post engaging portion 90 and side pin lock seat 58. If engagement of side pin lock 26 has not occurred, rotation of ball 14 about post 12 until post engaging portion 90 and side pin lock seat 58 are aligned may be necessary.

The above sequence for disengaging ball 14 from ball 12 was a sequential disengagement procedure since side pin lock 26 may be disengaged before ball and cage lock 30 based upon play in the system as shown in FIG. 3 where locking flange 56 is not immediately adjacent to ball bearings 118A–118F. In contrast, simultaneous disengagement may be designed for by positioning locking flange 56 such that it is adjacent to ball bearing bores 116A–116F. However, if the simultaneous disengaging procedure is designed for, one may still sequentially disengage by disengaging post engaging portion 90 of side pin lock 26 and then rotating ball 14 such that post engaging portion 90 is not aligned with side pin lock seat 58.

Figure 6:
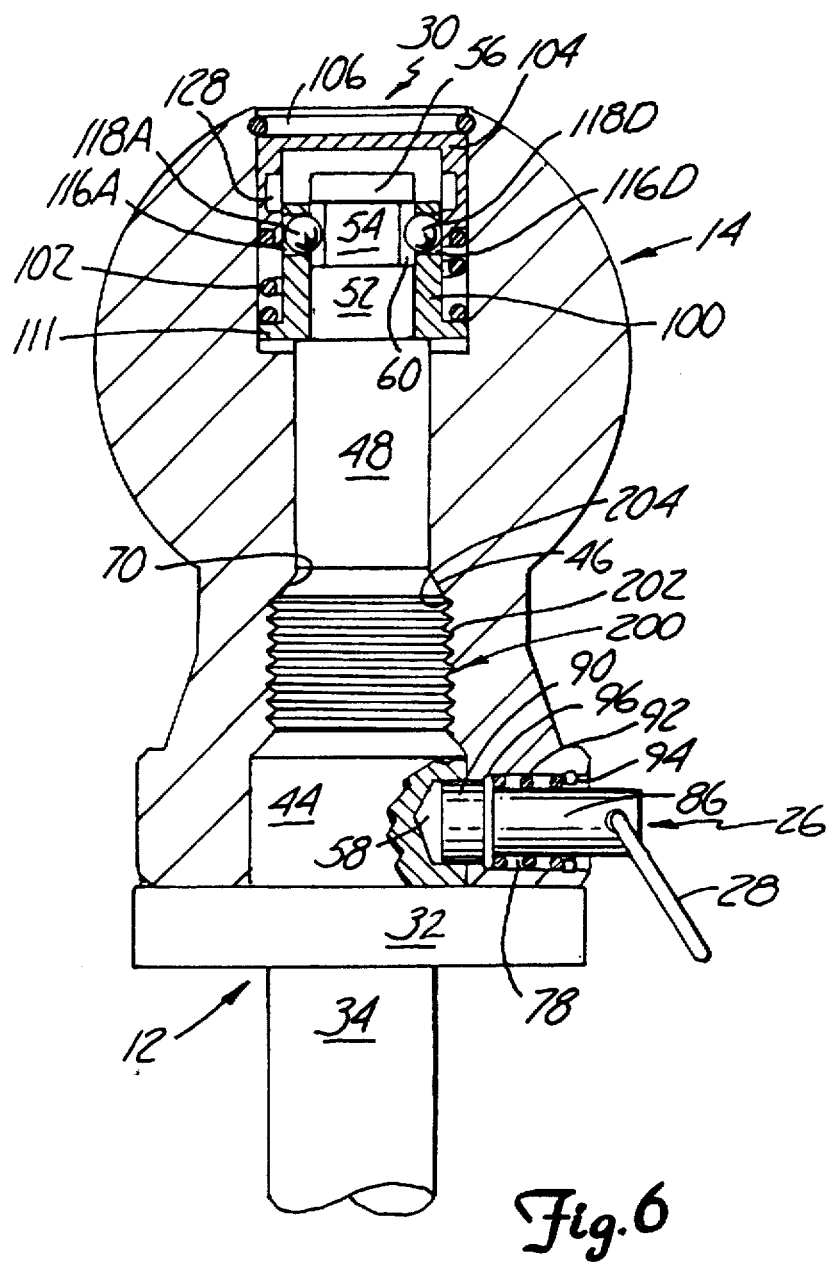
FIG. 6 is a side sectional view of a second embodiment of the ball exchange trailer hitch system when in a locked position.

FIG. 6 discloses an alternative exchangeable trailer ball hitch system which has three locking systems or mechanisms. Elements in this alternative embodiment are identically numbered to identical elements in the embodiment shown in FIGS. 1–5. This three locking mechanism exchangeable trailer ball hitch system includes side pin lock 26 and ball and cage lock 30. A third locking mechanism is a male-female threading lock 200. Post 12 includes a plurality of male threads 202. Ball 14 includes a plurality of female threads 204. When post 12 receives ball 14, male threads 202 mate will female threads 204. FIG. 6 shows male threads 202 and female threads 204 fully mated such that the exchangeable trailer ball hitch system is fully engaged and locked. Post engaging portion 90 of side pin lock 26 is seated inside pin lock seat 58. Locking flange 56 is held in place by ball bearings 118A–118F which are extending into ball locking channel 60 to prohibit locking flange 56 from being pulled from bore 114 in quick connect cage 100. In addition, the mating of male threads 202 to female threads 204 further secures ball 14 to post 12.

Figure 7:
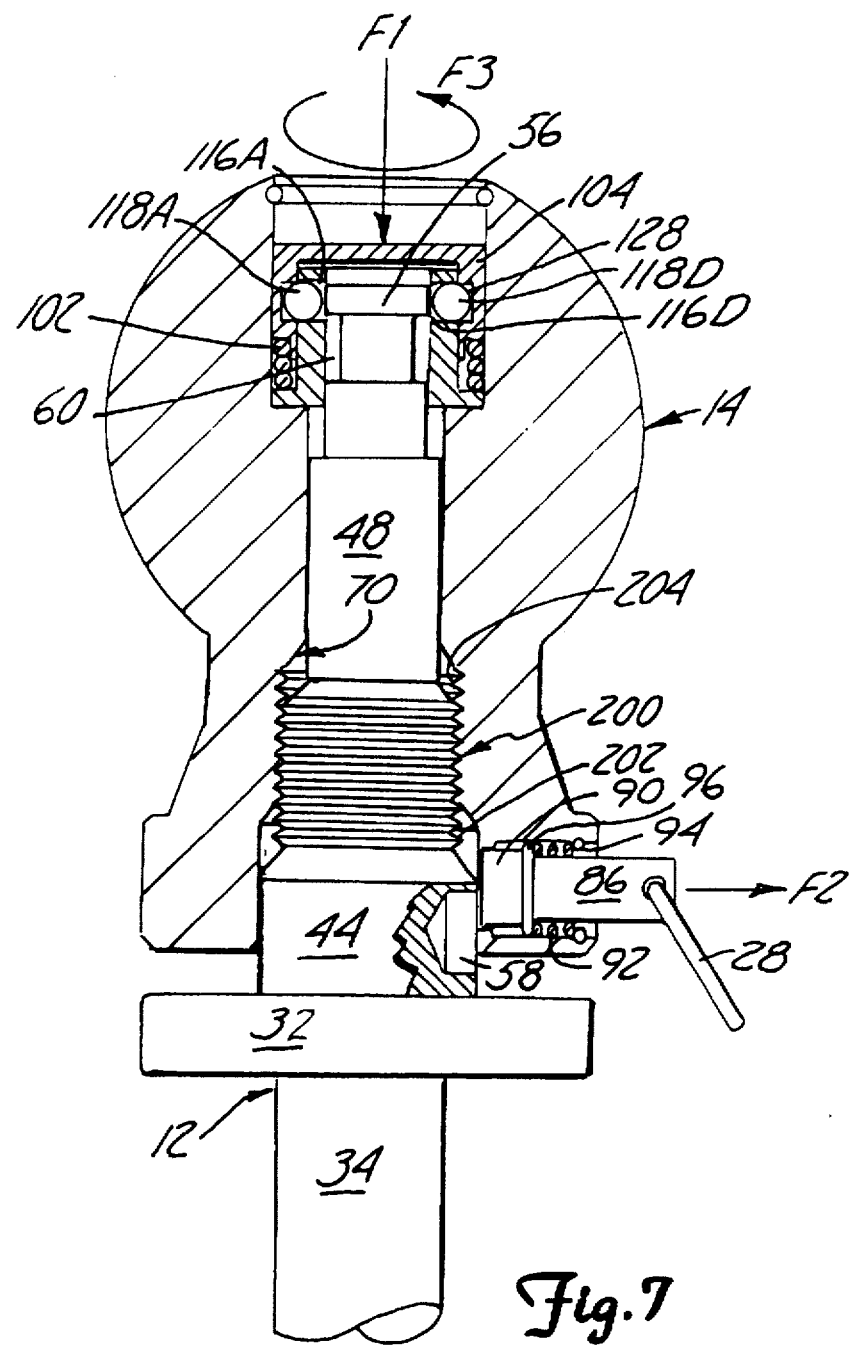
FIG. 7 is a side sectional view of the ball exchange trailer hitch system in FIG. 6 where the locking mechanisms are fully or partially disengaged.

The removal of ball 14 from post 12 is shown in FIG. 7. Forces F1, F2, and F3 are required to disengage the three locking mechanisms. The typically procedure for disengagement is a three-step procedure. First, force F2 is placed upon side pin lock such that post engaging portion 90 is removed from side pin lock seat 58. Second, force F3 is placed upon ball 14 such that ball 14 rotates about post 12 to disengage female threads 204 from male threads 202. Third, force F1 is placed upon quick connect housing 104 to compress the housing such that quick connect cage 100 is received therein. The compression of quick connect cage 100 into quick connect housing 104 aligns race 128 with ball bearing bores 116A–116F to allow ball bearings 118A–118F to move from extending into bore 114 to hanging out in race 128. The exertion of force F3 may occur after the complete disengagement of female threads 204 from male threads 202, or at some point during this disengagement. This process is reversed to position ball 14 back onto post 12.

The exchangeable trailer ball hitch system includes either two or three locking mechanisms such that ball 14 may be securely fastened to post 12 while remaining easily removable. This removability allows the vehicle user to exchange various size and shape balls as is needed to tow different trailers.

Although the present invention has been described with reference to preferred embodiments, workers skilled in the art will recognize that changes may be made in form and detail without departing from the spirit and scope of the invention.

What is claimed is:

1. A trailer towing device comprising:
a post configured for attachment to a vehicle, the post including an integral flange for rigidly supporting the trailer towing device when secured to a vehicle, and the post having a first and a second locking region; and
a unitary ball having a post aperture for receiving the post, the ball including a spherical portion for receiving a socket on a trailer, a neck portion, and a base portion, the ball having a first and a second locking mechanism;
wherein the first locking mechanism is spring biased inward to selectively interact with the first locking region and the second locking mechanism is positioned to selectively interact with the second locking region to secure the ball to the post when the post is received by the post aperture of the ball.

2. The trailer towing device of claim 1 wherein one of the locking mechanisms includes a locking pin slidable within a pin aperture through the ball, where the locking pin is movable from a first pin position where a corresponding one of the locking regions is engaged to a second pin position where the locking pin is disengaged from the corresponding locking region.

3. The trailer towing device of claim 2 wherein the corresponding locking region includes a notch that the locking pin engages for preventing removal of the post from the post aperture of the ball when the locking pin is in a first pin position and the post is in a first post position, while when in a second pin position the locking pin is removed from the notch for allowing removal of the post from the post aperture in the ball resulting in the post moving to a second post position.

4. The trailer towing device in claim 3 wherein the locking pin is spring-loaded for biasing the locking pin to the first pin position.

5. The trailer towing device in claim 1 wherein one of the locking mechanisms includes a quick connect cage and a quick connect housing, where the quick connect housing defines a housing bore and the quick connect cage is inserted at least in part into the housing bore, and wherein the one of the locking mechanisms includes a spring positioned in between a cage shoulder on the quick connect cage and a housing shoulder on the quick connect housing for biasing the one of the locking mechanisms into a first lock position where the quick connect cage is biased away from the quick connect housing.

6. The trailer towing device of claim 5 wherein the post aperture of the ball includes a groove and the one of the locking mechanisms includes a snap ring for insertion into the groove for securing the quick connect cage and quick connect housing in the post aperture in between a ball shoulder and the snap ring.

7. The trailer towing device in claim 6 wherein the quick connect cage includes a plurality of ball bearing apertures extending through the quick connect cage, with each ball bearing aperture having a ball bearing therein, and the quick connect housing including a race in the housing bore, wherein the quick connect housing is movable from the first lock position where each of the plurality of ball bearings is extendable out of its respective ball bearing aperture into a post bore to a second lock position where all of the plurality of ball bearings remain completely within its respective ball bearings aperture and the race for allowing the post to be removed from the post aperture.

8. The trailer towing device of claim 7 wherein one of the locking regions on the post includes a locking flange.

9. The trailer towing device of claim 1 wherein one of the locking mechanisms includes a threaded section in the post aperture of the ball while one of the locking regions includes a threaded post section on the post.

10. The trailer towing device in claim 1 wherein the ball further comprises a third locking mechanism including a threaded section in the post aperture of the ball while the post further comprises a second locking region including a threaded post section on the post.

11. A trailer towing device comprising:
a post configured for attachment to a vehicle, the post having a ball attachment shaft and a vehicle attachment shaft axially aligned, the ball attachment shaft including an inwardly extending radial notch and a threaded surface, and the post further having a flange extending transversely outward between the ball attachment shaft and the vehicle attachment shaft, wherein the flange is integral with the post and includes at least one surface for rigidly supporting the trailer towing device when secured to a vehicle;
a unitary ball having a substantially spherical portion, a neck portion, and a base portion including a pin aperture extending from an outer surface of the ball to a post-receiving aperture extending into the ball from the base portion and for receiving the ball attachment shaft, the post-receiving aperture including a threaded surface for cooperative mating with the post threaded surface for securing the ball to the ball attachment shaft when the ball is threaded onto the post; and,
a locking pin slidable within the pin aperture and biased inward into selective engagement with the notch when the notch and pin aperture are aligned for selectively securing the ball to the ball attachment shaft.

12. The trailer towing device of claim 11 wherein the locking pin is a spring-loaded locking pin.

13. The trailer towing device of claim 11 wherein the pin aperture further comprises an annular shoulder against which the locking pin is biased, and wherein the pin further comprises an annular shoulder against which the spring is compressible.

14. The trailer towing device of claim 13 further comprising a snap ring, and wherein the pin aperture includes an annular snap ring groove in which the snap ring is seated for slidably retaining at least a part of the pin therein.

15. The trailer towing device of claim 11 wherein the post-receiving aperture extends axially through the ball from the base portion to the spherical portion, and further comprises a cage lock in the post-receiving aperture for engaging the post.

16. The trailer towing device of claim 15 wherein the cage lock comprises a hollow annular sleeve and a hollow cap wherein a cage spring biases the hollow cap away from the hollow annular sleeve, the hollow annular sleeve having a plurality of radial bores wherein a plurality of ball bearings are slidably seated in the plurality of bores, and the hollow cap having an annular race therein for selectively receiving the plurality of ball bearings, and wherein the cap is operable to fit over the sleeve.

17. A trailer towing device consisting of:
a post configured for attachment to a vehicle, the post having an elongated shaft divided in the mid-section by a flange extending transversely outward from the shaft;
a unitary ball having a substantially spherical portion, a neck portion, and a base portion including a post-receiving aperture extending into the ball from the base portion for receiving the post;

a first lock restricting removal of the ball from the post along a central axis of the post; and, a second lock restricting removal of the ball from the post along the central axis of the post.

18. The trailer towing device in claim 17 wherein the base portion includes a pin aperture extending from an outer surface of the ball to the post-receiving aperture extending into the ball.

19. The trailer towing device in claim 18 wherein the first lock includes a locking pin slidable within the pin aperture.

20. The trailer towing device in claim 19 wherein the post includes a notch for selectively receiving the locking pin which when received prevents removal of the ball from the post.

21. The trailer towing device in claim 20 wherein the locking pin is spring-loaded for biasing the locking pin towards the notch.

22. The trailer towing device in claim 20 wherein the second lock includes a threaded outer surface on the elongated shaft, and wherein the post-receiving aperture is threaded for cooperative mating with the threaded outer surface of the elongated shaft.

23. The trailer towing device in claim 17 wherein the second lock includes a threaded outer surface on the elongated shaft.

24. The trailer towing device in claim 23 wherein the post-receiving aperture is threaded for cooperative mating with the threaded outer surface of the elongated shaft.

25. The trailer towing device in claim 17 further comprising a third lock for restricting removal of the ball from the post along the central axis of the post.

26. The trailer towing device in claim 25 wherein the third lock includes a plurality of ball bearings within a race where each of the ball bearings selectively restricts removal of the post from the post-receiving aperture within the ball.

27. The trailer towing device in claim 26 wherein the third lock includes a release button for selectively releasing the ball bearings from engagement with the post where the ball bearings are biased into said engagement.

* * * * *